Sept. 1, 1925.
G. J. WILLIAMS
AIR BRAKE FOR AEROPLANES
Filed Jan. 24, 1924     5 Sheets-Sheet 1
1,552,370
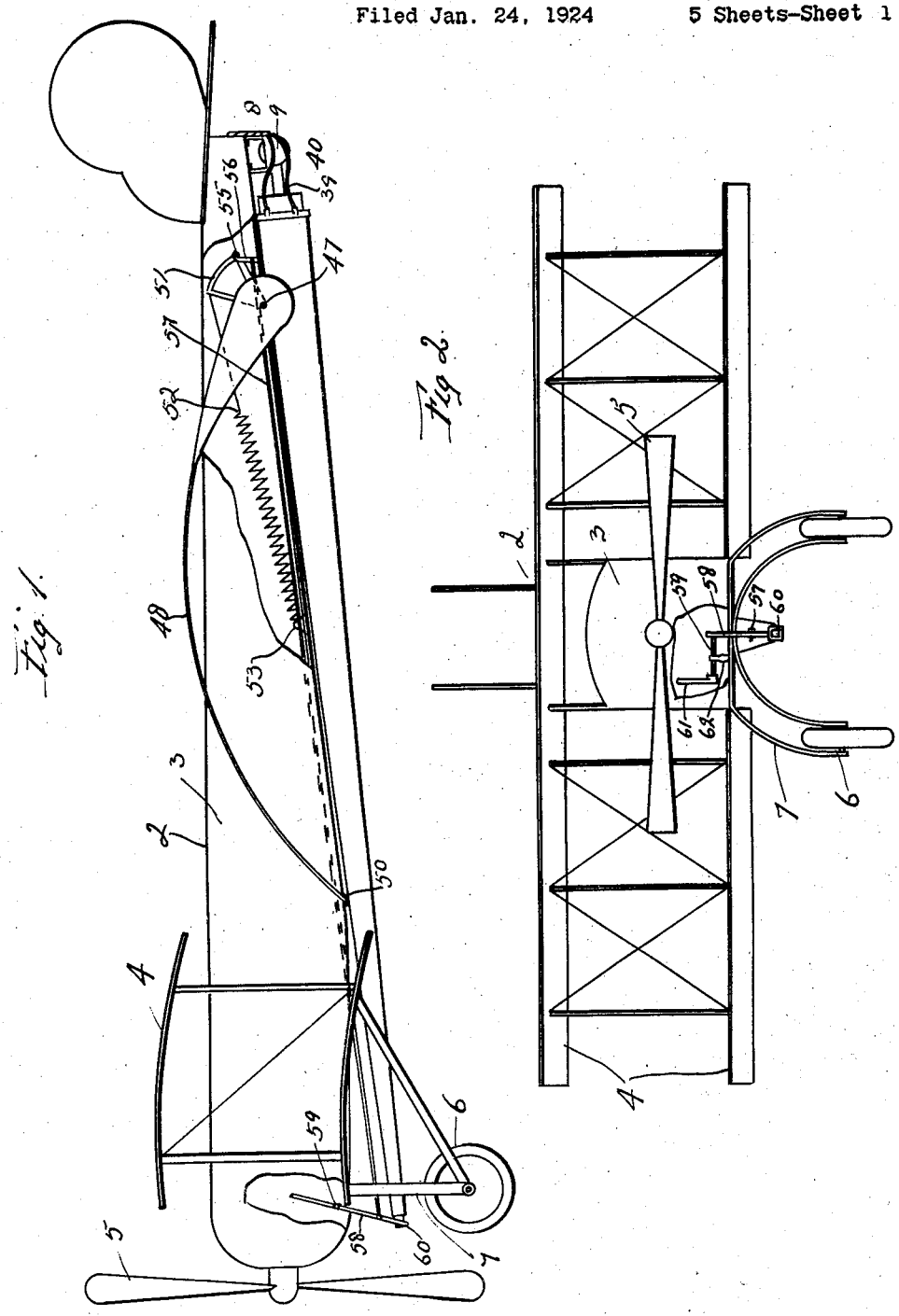
INVENTOR
George J. Williams
By W. W. Williamson
Atty.

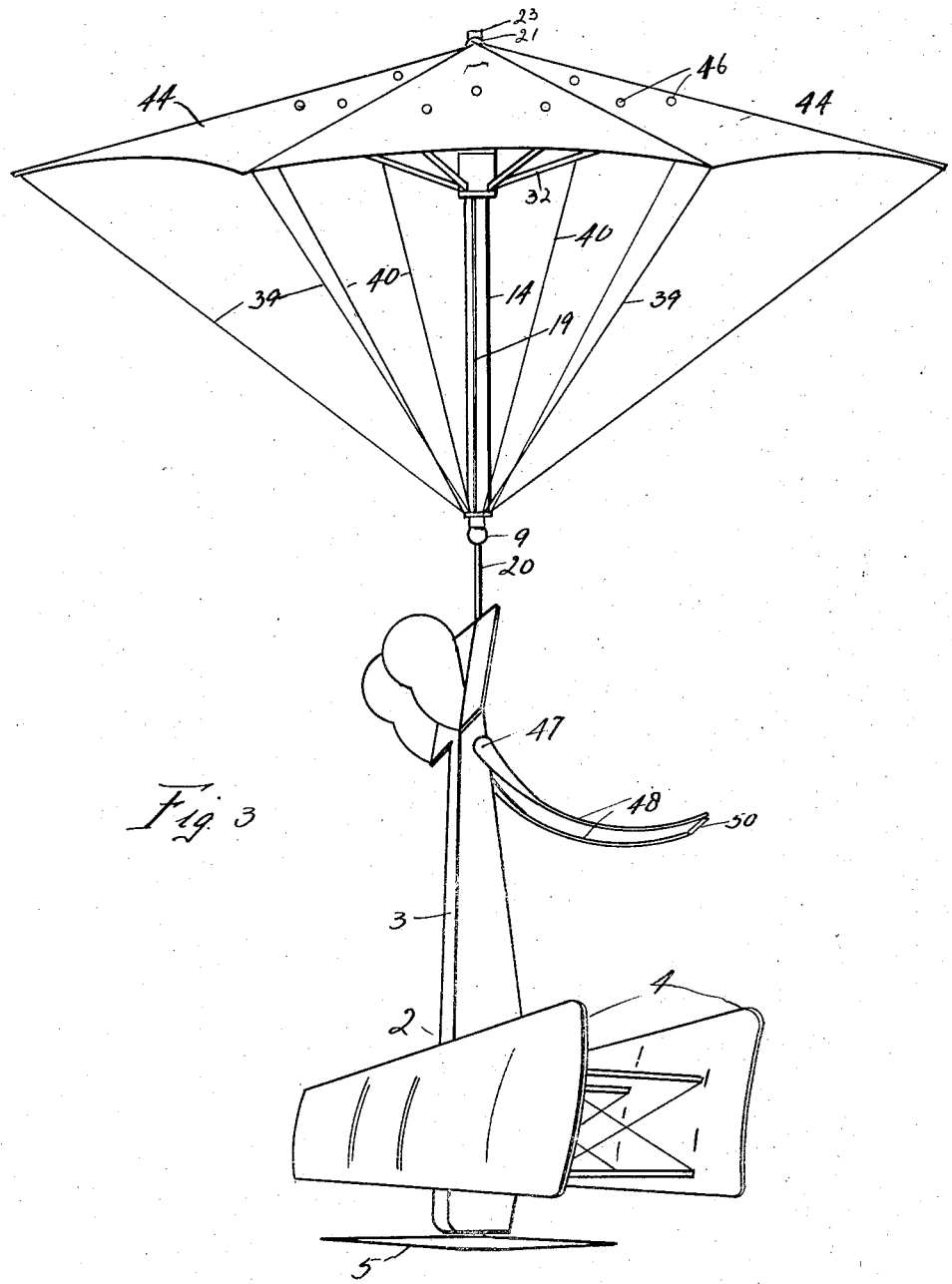

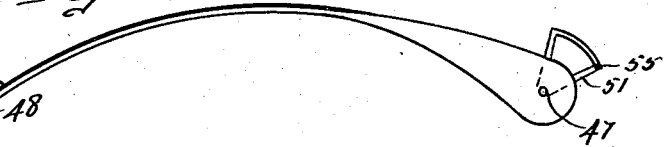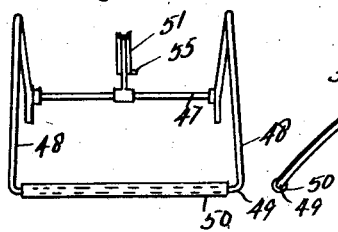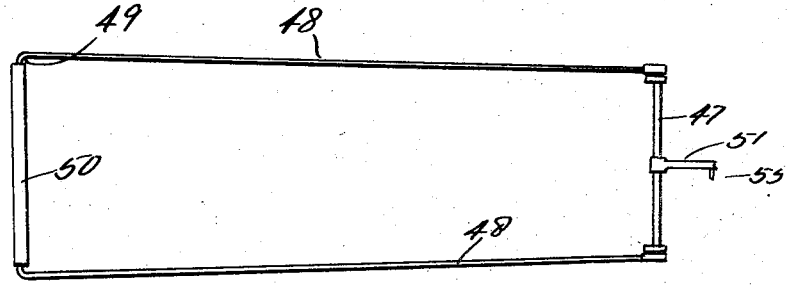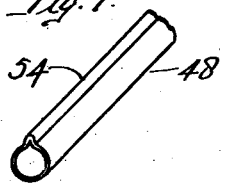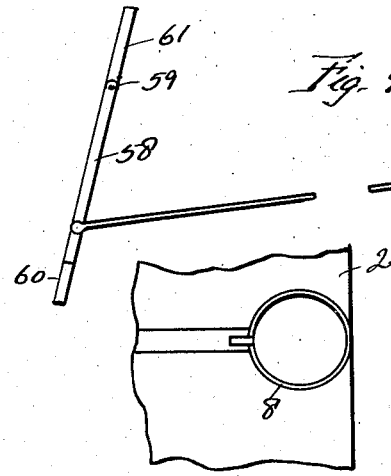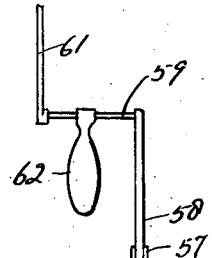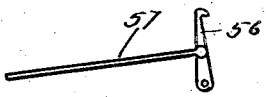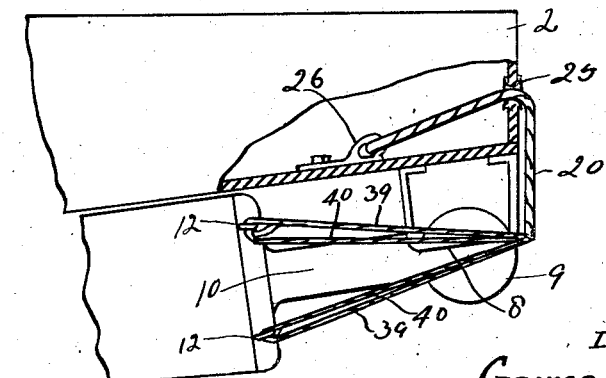

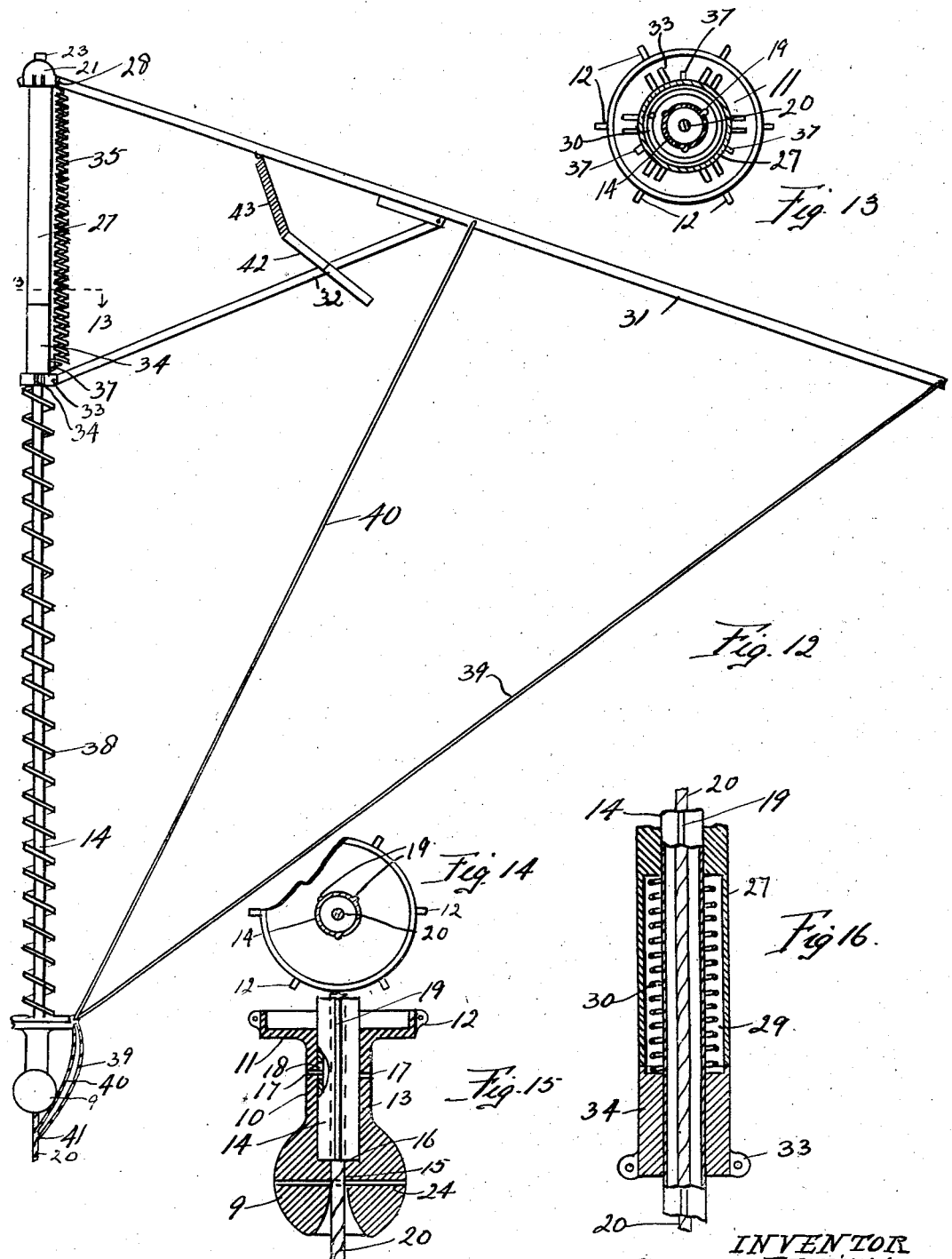

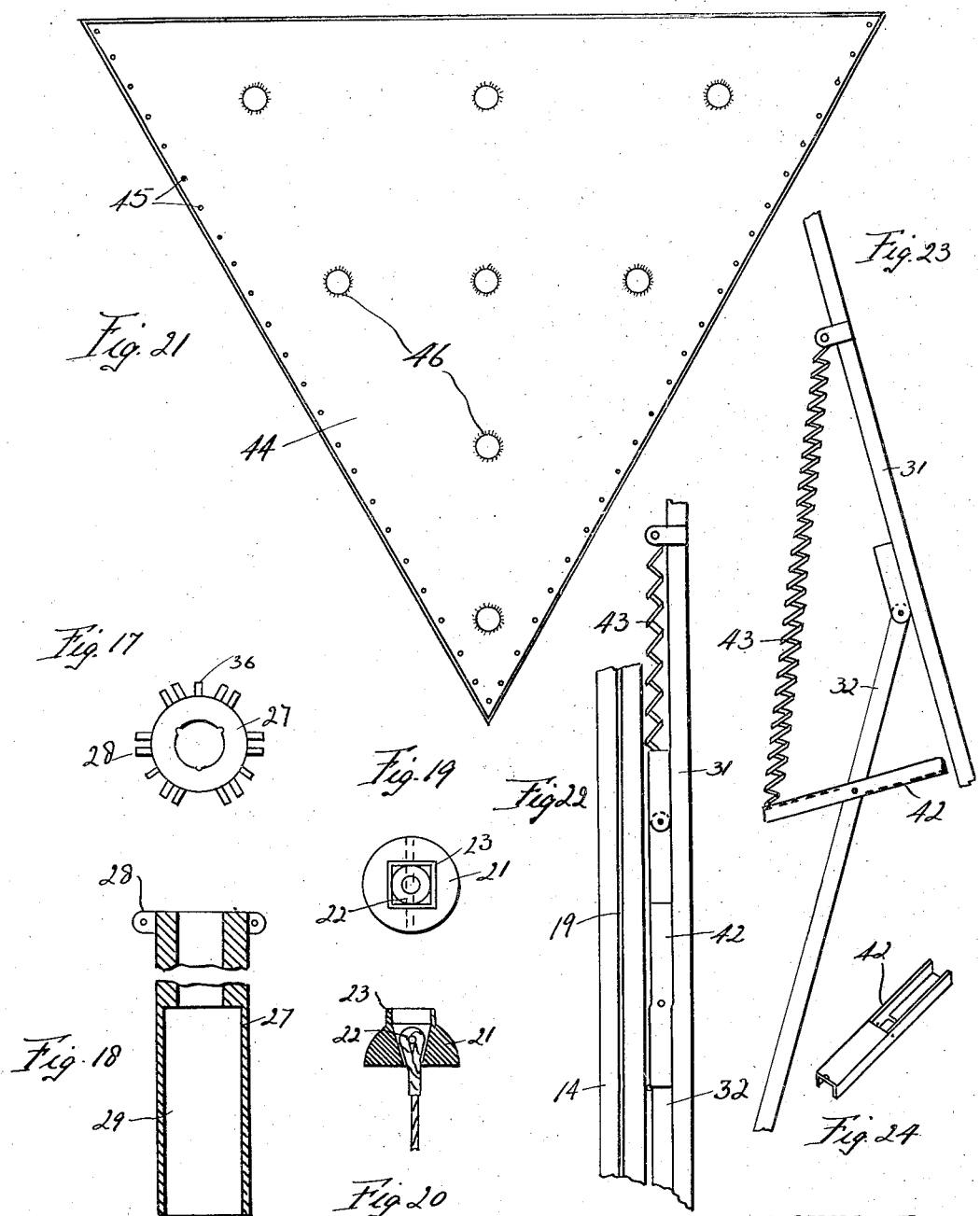

Patented Sept. 1, 1925.

1,552,370

UNITED STATES PATENT OFFICE.

GEORGE J. WILLIAMS, OF PHILADELPHIA, PENNSYLVANIA.

AIR BRAKE FOR AEROPLANES.

Application filed January 24, 1924. Serial No. 688,136.

*To all whom it may concern:*

Be it known that I, GEORGE J. WILLIAMS, a citizen of the United States, residing at Philadelphia, in the county of Philadelphia and State of Pennsylvania, have invented new and useful Improvements in an Air Brake for Aeroplanes, of which the following is a specification.

My invention relates to new and useful improvements in an air brake for aeroplanes, and has for its primary object to provide in combination with an aeroplane a parachute that may be ejected from beneath the aeroplane and caused to swing to the rear thereof so as to act as a drag and finally support the entire aeroplane in a slow descent to the earth.

The device is adapted for use only in emergencies such as when head-on collisions are unavoidable or when due to some disability it is impossible to properly operate the aeroplane. In such instances the release of the parachute will stop the progress of the aeroplane and cause it to descend slowly so that the aviator will not be injured and the aeroplane possibly damaged.

Another object of the invention is to provide for releasably holding the parachute beneath the fuselage of the aeroplane with the crown of the parachute projecting into the same direction as the travel of the aeroplane, or in other words, the crown of the parachute is at the bow of the aeroplane while the edge is at the stern.

Another object of the invention is to provide an automatic kick-off or ejector for forcing the parachute away from the aeroplane fuselage so that said parachute will be moved into position at the stern of the aeroplane.

A further object of the invention is to provide for automatically opening the parachute making it unnecessary to depend upon air entering the parachute to open it.

A still further object of the invention is to provide a unique manner of fastening the parachute guy ropes to the parts thereof and to the main supporting cable.

Other objects will appear hereinafter and included in this is a means acting as a buffer to absorb some of the shock incident to the opening of the parachute; a means for enclosing the free ends of the spreader ribs and the covering or envelope of the parachute; the particular means for attaching the parachute to the aeroplane; and the constructional details of the parachute cover with the mode of fastening the same to the spreader ribs of the parachute frame.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a side elevation of an aeroplane illustrating one manner in which my invention may be utilized to the operations of the aeroplane being broken away to clearly show the details of construction.

Fig. 2, is a bow view thereof with a portion broken away to show the position of the parachute releasing mechanism.

Fig. 3, is a side elevation of the device showing the manner of supporting an aeroplane during its descent.

Fig. 4, is an end view of the kick-off or ejector removed from the aeroplane.

Fig. 5, is a side elevation thereof.

Fig. 6, is a plan view of the same.

Fig. 7, is an enlarged fragmentary sectional perspective of the frame work of the kick-off illustrating one way in which it may be braced or strengthened.

Fig. 8, is an end view of the parachute supporting and releasing mechanism.

Fig. 9, is a fragmentary side elevation thereof.

Fig. 10, is an enlarged fragmentary sectional side elevation showing the details of construction utilized in connecting the parachute to the aeroplane.

Fig. 11, is a fragmentary bottom plan view of the aeroplane fuselage showing the socket in which the parachute swings at the time of its release.

Fig. 12, is an enlarged fragmentary side elevation of the aeroplane frame illustrating with one spreader rib and its component parts the position of the different elements when the parachute is open.

Fig. 13, is an enlarged sectional view at the line 13—13 of Fig. 12 with the parachute frame or ribs and certain of the springs removed.

Fig. 14, is a plan or inner end view of the member which acts as a universal bearing for the parachute and also as a holder for the free ends of the ribs in connection with a section of the parachute stem.

Fig. 15, is a fragmentary sectional side elevation thereof.

Fig. 16, is an enlarged sectional view of the parts which make up the buffer or shock absorber.

Fig. 17, is an upper end view of the barrel holding the buffer spring and to which the inner ends of the spreader ribs are fastened.

Fig. 18, is a fragmentary longitudinal sectional view thereof.

Fig. 19, is a plan view of the cap of the parachute to which the main supporting cable is fastened.

Fig. 20, is a sectional view thereof showing the manner of attaching the cable thereto.

Fig. 21, is a plan view of one section or segment of the parachute cover.

Fig. 22, is a fragmentary side elevation of the parachute stem showing the manner in which the ribs fold there against.

Fig. 23, is a fragmentary side elevation of one rib structure showing in detail one manner of giving the initial opening movement to the parachute.

Fig. 24, is a detail perspective view of the lever used in the structure shown in Fig. 23.

In carrying out my invention as here embodied, 2 represents an aeroplane of usual or any well known construction including a fuselage 3, planes 4, a propeller 5 and a landing gear 6. The chassis 7 of the landing gear is arched, as plainly shown in Fig. 2, or otherwise conveniently shaped so as to not interfere with the operations of the parachute to be presently described.

At the stern or tail end of the aeroplane is located a suitable bearing 8 preferably in the form of a socket, as shown in Figs. 10 and 11, the said bearing being engaged by the ball member 9 so as to act similar to a ball and socket joint and it is to be understood that this ball member may be any suitable section of a ball. The ball member is provided with a neck 10 which carries a recessed head 11 to fit over the free ends of the parachute ribs as will be later described and the head 11 is provided with a plurality of ears 12. This ball member and its component parts has a bore of two different diameters, the larger portion 13 registering with the end of the parachute stem 14 while that portion of the bore of smaller diameter as represented at 15 is for the passage of the connecting cable and is preferably flared outward, as plainly shown in Fig. 15, while the difference in diameters of the two portions of the bore produces a shoulder 16 to limit the movement of the ball member in one direction. As this ball member must have a slight movement on the parachute stem, I have shown pins 17 fixed in the neck 10 of the ball member and registering with slots 18 in the stem 14.

The stem 14 is of tubular formation and is provided with exterior splines 19 so as to strengthen the stem and act as guides for the different moving parts and also act as stops to prevent rotation of the elements on the stem, said parts having grooves corresponding to the splines as may be seen in Figs. 13, 14 and 17. A suspension or connecting cable 20 passes through the stem 14 and has one end fastened to the cap 21, Figs. 19 and 20, the latter being mounted on the upper end of the stem or at the crown of the parachute and as here shown this cable is preferably connected to the cap by forming a loop therein and pass a pin 22 through said loop with the ends thereof set in the walls of the cap. The cap is provided with an extension 23 preferably of rectangular shape for registration with a member of the parachute for holding and releasing the structure to be later described.

The cable 20 passes through the stem but is not taut therein and where it projects from the stem it passes through the smaller portion 15 of the bore in the ball member where said ball member is attached to the cable by means of a pin 24. From the ball member the cable is carried around through a hawse ring 25 in the tail of the aeroplane and has the end fixed to a suitable anchorage device 26.

Near the upper end of the parachute stem is fixed a barrel 27 carrying ears 28 and having a chamber 29 at its lower end in which is located a buffer spring 30. To the ears 28 of this barrel are pivoted the upper ends of the spreader ribs 31 while the intermediate ends of these spreader ribs are hinged to the outer ends of the brace ribs 32, the inner ends of the latter being pivoted to the ears 33 of the sliding sleeve 34 which is slidably mounted upon the stem 14. The sliding sleeve is normally forced upward or toward the barrel 27 by means of suitable springs 35 attached to lugs 36 on the barrel 27 and to similar lugs 37 on the sleeve 34 and these springs are normally distended or expanded when the parachute is in a closed position. The movement of the sleeve 34 is assisted by a spring 38 coiled about the stem 14 with one end resting against a portion of the ball member as the stationary element while the other end engages the sleeve 34 as the movable element.

The guy rope 39 is fixed to the outer end of each of the spreader ribs and another similar guy rope 40 is fixed to each spreader rib intermediate its ends or adjacent the points of connections of the brace ribs with the spreader ribs. These guy ropes are then secured in the ears 12 and the ends spliced into the cable 20 at a point below the ball member as indicated at 41 and plainly shown in Figs. 10 and 12.

When the different parts of the parachute frame are in a folded condition the ribs will be practically in parallel positions and in order to assist in opening the parachute or imparting an initial opening movement thereto I pivot to each of the brace ribs a lever 42 which is constructed as shown in Fig. 24 so as to fold upon the brace rib as will be obvious and when moved to a position such as shown in Fig. 23 will be brought to a stop by contact of the inner edges of the lever with opposite faces of the brace rib. This lever is moved to the position indicated in Fig. 23 by a spring 43 attached to one end of the lever and to some suitable portion of a spreader rib and during the movement of the lever its outer or free end will engage the contiguous spreader rib so as to force said spreader rib away from the brace rib and after the two ribs have been moved out of parallelism into an angular position such as shown in Fig. 23 the continued action of the spring 43 will assist in opening the parachute.

The parachute covering or envelope comprises a plurality of individual sections of segments 44 of suitable textile material such as canvas and the edges of all these sections are corded with a bolt rope as is generally done in sail making. The meeting edges of all the sections or segments are provided with a plurality of grommetted holes 45 by which the sections or segments may be laced or tied to the different spreader ribs of the parachute frame and in practice individual ties are used so that a single cord is passed through each hole 45 and around a spreader rib which reduces to a minimum the chance of one of the sections becoming free of the parachute frame since the breaking of one tie does not affect the others. Each section of the cover has one or more flue openings or apertures 46 therein which like the holes 45 are also grommetted but the holes 46 permit a certain amount of air beneath the parachute to pass through the covering thus permitting the parachute to slowly descend while retaining it in a stable condition.

At some suitable point on the aeroplane fuselage and preferably adjacent the tail end thereof is located a transverse shaft 47 which is preferably so arranged that the major portion is within the fuselage while the ends project beyond the side walls thereof and on these projecting ends are fixed the side bows 48 of the kick-off or ejector with a cross bar 49 at their outer or free ends on which is journalled a roller 50. The side bows 48 extend along the outside of the fuselage with the cross bar 49 and its roller underlying the bottom wall of the fuselage. To the shaft 47 is fixed a quadrant 51 or its equivalent and with this connected one end of a spring 52, and there may be two or more of these springs, while the other end of said spring is anchored as at 53 to a suitable anchoring device attached to the fuselage and preferably within the same and when the kick-off or ejector is in the position shown in Fig. 1, the spring 52 is under tension. As shown in Fig. 7 the bow sides of the kick-off are preferably of tubular formation with a longitudinal strengthening rib 54 formed thereon.

In order to hold the parts, and more particularly the kick-off, as shown in Fig. 1, the quadrant is provided with a trigger pin 55 adapted to be engaged by the hooked end of a suitable catch 56, Fig. 9, pivoted within the fuselage and having one end of a connecting rod 57 pivoted thereto while the other end is pivoted to a hanger 58 the latter being fixed to a hanger shaft 59 suitably journalled within the aeroplane fuselage in the region of the space occupied by the aviator. The hanger 58 is provided with a loop 60 of a shape suitable to fit or register with the projection 23 on the cap 21 so as to retain the upper or crown end of the parachute, when folded, and hold said parachute in suspension directly beneath the fuselage longitudinally thereof. In order to actuate the hanger 58 and associated parts a hand lever 61 and a foot pedal 62 are provided which are attached to the hanger shaft 59 thereby permitting the aviator to release the parachute either by hand or foot according to the conditions prevailing at the time of the release.

In practice when there is no need of using the air brake the parachute is suspended beneath the fuselage of the aeroplane longitudinally thereof with the ball member resting on or in the bearing surface which is here shown as a socket at the tail of the aeroplane and said ball is held in this position since the suspending or attached cable between the ball member and the anchorage 26 is taut. The opposite or crown end of the parachute is held in place by the engagement of the loop 60 on the hanger 58 with the extension 23 on the cap 21 therefore the apex or closed end of the parachute is pointing in the direction of travel of the aeroplane and cannot be accidentally operated or produce a drag during operation of the aeroplane.

When the parachute is in this position the cross bar 49 of the kick-off or ejector is resting upon the parachute and is interposed between said parachute and the fuselage of the aeroplane. The kick-off is held in such position against the action of the spring 52 by means of the catch 56 in engagement with the lock pin 55 on the quadrant 51. It is to be understood that the only use of the quadrant is to provide a greater throw for the kick-off since the spring or fastening element may pass over the arcuate portion of the quadrant and be fixed to the end farthest removed from the anchorage point of the spring.

It is to be further understood that when the parachute is closed or folded the ball member 9 is positioned in such a location that the recessed head 11 thereof telescopes over the free ends of the spreader ribs and the free edge of the covering so as to hold these parts in place and prevent them from flapping.

When it becomes necessary to use the brake due to some emergency the hanger 58 is actuated through the medium of either the hand lever 61 or the foot pedal 62 which will disengage the loop 60 from the apex end of the parachute and at the same time, through the medium of the connecting rod 57, will disengage the latch 56 from the locking pin 55 thereby permitting the spring 52 to act for rotating the shaft 47 which will move the kick-off or ejector outward away from the aeroplane and positively force the parachute out of its suspended position in the arc of a circle with the ball and socket as the center for the first part of the movement. This forced movement of the parachute will give the latter a tendency to move radially due to centrifugal force so that portion of the suspension or connecting cable within the parachute stem will be drawn taut allowing the ball member and its component parts to be moved along the parachute stem so as to release the parachute spreader ribs. At this time the action of the different springs will open the parachute and although the kick-off will have followed the parachute a considerable distance of its movement said kick-off will not interfere with the opening of said parachute because of the curvature of the side bows.

As soon as the parachute begins to open air will enter the same and assist the springs in opening it to its full extent. As soon as the parachute is opened it will form a drag on the aeroplane and stop the forward progress thereof and finally cause the aeroplane to hang nose downward as shown in Fig. 3. If the aeroplane is falling and the parachute released it will then "break" and in either case after the parachute is released it will allow the aeroplane to slowly descend so that little or no damage will occur thereto but even should the aeroplane be damaged the occupant or occupants thereof will be uninjured.

Of course I do not wish to be limited to the exact details of construction as herein shown as these may be varied within the limits of the appended claims without departing from the spirit of my invention.

Having thus fully described my invention, what I claim as new and useful is:—

1. The combination with an aeroplane, of a parachute, means to suspend said parachute collapsed beneath the aeroplane longitudinally thereof with the apex of the parachute pointing in the direction of travel of the aeroplane, flexible means for attaching the parachute to the tail of the aeroplane, a kick-off to force the parachute away from the aeroplane, and means to release the parachute and the kick-off.

2. The combination with an aeroplane, of a parachute including a tubular stem, a cable fixed to an end of said stem, passing through the same and projecting from the other end, said projecting portion being fixed to the tail end of the aeroplane, a ball member having a recessed head slidably mounted upon the stem, a bearing carried by the areoplane against which the ball member rests, spreader ribs pivoted at the upper end of the stem, brace ribs pivoted to the spreader ribs, a sleeve slidable on the stem and to which the brace ribs are also pivoted, means to normally force the ribs to open positions, guy ropes attached to the spreader ribs at different points, to the ball member and to the cable beyond said ball member, a covering of individual apertured sections, means to tie said sections to the spreader ribs at spaced points, each tie being separate of all others, the edge of the covering and the free ends of the spreader ribs being confined in the recessed head of the ball member when the parachute is closed, means to releasably suspend the parachute in a closed condition beneath the aeroplane with the crown of the parachute pointing in the direction of travel of the aeroplane, spring actuated means carried by the aeroplane to force the parachute therefrom when released, and means within the parachute to open the same.

3. In combination with an aeroplane and a parachute connected thereto, means to hold the parachute collapsed, means to suspend the parachute beneath the aeroplane, and means to force the parachute away from the aeroplane when released, said means including a shaft, a quadrant thereon, a spring fixed to the quadrant and anchored to the aeroplane, tubular side bows fixed to the ends of the shaft and lying adjacent the sides of the aeroplane, means to strengthen said bows, a cross bar at the outer free ends of said bows and passing beneath the aeroplane between it and the parachute and a roller journalled on said cross bar.

4. The combination with an aeroplane, of a parachute, means to normally hold said parachute collapsed against the aeroplane body longitudinally thereof with the apex of the parachute pointing in the direction of travel of said aeroplane, means to swingingly attach the parachute to the tail of the aeroplane, means to give an initial swinging movement to said parachute when released, and means to release said last named means and the parachute.

5. The combination with an aeroplane, of a parachute, a tubular parachute stem, a cable fixed to an end of said stem, passing through the same and projecting from the other end, said projecting end of the cable being fixed to the tail of the aeroplane for swingingly connecting said parachute to said aeroplane, a ball member slidably mounted on the stem, a bearing on the aeroplane with which the ball member coacts, means to hold the parachute on the outside of the aeroplane body longitudinally thereof with the apex of the parachute pointing in the direction of travel of the aeroplane, means to release said holding means, and means to give an initial swinging movement to the parachute when the latter is released.

In testimony whereof, I have hereunto affixed my signature.

GEORGE J. WILLIAMS.